(12) United States Patent
Tanaka et al.

(10) Patent No.: US 9,691,541 B2
(45) Date of Patent: Jun. 27, 2017

(54) WINDING COMPONENT ATTACHMENT STRUCTURE AND POWER CONVERSION DEVICE PROVIDED WITH SAID ATTACHMENT STRUCTURE

(71) Applicant: FUJI ELECTRIC CO., LTD., Kawasaki-shi, Kanagawa (JP)

(72) Inventors: Yasuhito Tanaka, Yokosuka (JP); Shun Fukuchi, Suzuka (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/159,154

(22) Filed: May 19, 2016

(65) Prior Publication Data
US 2016/0260538 A1 Sep. 8, 2016

Related U.S. Application Data

(63) Continuation of application No. PCT/JP2014/002795, filed on May 27, 2014.

(51) Int. Cl.
*H01F 38/20* (2006.01)
*H01F 27/00* (2006.01)
(Continued)

(52) U.S. Cl.
CPC ......... *H01F 27/2895* (2013.01); *H01F 27/02* (2013.01); *H01F 27/06* (2013.01);
(Continued)

(58) Field of Classification Search
USPC ............ 336/173, 100, 105, 90, 92, 192, 221
See application file for complete search history.

(56) References Cited

U.S. PATENT DOCUMENTS

| 4,513,274 A | * | 4/1985 | Halder | G01R 15/185 |
| | | | | 324/127 |
| 4,631,509 A | * | 12/1986 | Arii | H01F 27/06 |
| | | | | 336/197 |

(Continued)

FOREIGN PATENT DOCUMENTS

| JP | H08-138944 A | | 5/1996 |
| JP | 11238629 | * | 8/1999 |

(Continued)

OTHER PUBLICATIONS

PCT, "International Search Report for International Application No. PCT/JP2014/002795".

(Continued)

*Primary Examiner* — Mangtin Lian
*Assistant Examiner* — Kazi Hossain
(74) *Attorney, Agent, or Firm* — Manabu Kanesaka

(57) ABSTRACT

Winding components, each being formed by winding a coil around and along an inner peripheral surface and an outer peripheral surface of a ring-shaped core a plurality of times, are fixed to a case. An attachment structure includes a placing member made of an insulating material and fixed to a fixing surface of the case in a state where a lower surface of the winding component is placed, a pressing member made of an insulating material and disposed to abut on an upper surface of the winding component, and a pressing force imparting portion that couples the placing member with the pressing member and imparts a pressing force toward the fixing surface, from the pressing member to the winding component, and in the pressing force imparting portion, a distance between the placing member and the pressing member is variable in accordance with a height change of the winding component.

7 Claims, 8 Drawing Sheets

(51) Int. Cl.

| | | |
|---|---|---|
| | *H01F 17/00* | (2006.01) |
| | *H01F 27/02* | (2006.01) |
| | *H01F 27/29* | (2006.01) |
| | *H01F 27/28* | (2006.01) |
| | *H01F 27/06* | (2006.01) |
| | *H01F 37/00* | (2006.01) |
| | *H01F 27/08* | (2006.01) |
| | *H02M 7/02* | (2006.01) |
| | *B60L 11/18* | (2006.01) |
| | *H02M 7/00* | (2006.01) |
| | *H01F 27/22* | (2006.01) |

(52) U.S. Cl.
CPC .............. *H01F 27/08* (2013.01); *H01F 37/00* (2013.01); *H02M 7/02* (2013.01); *B60L 11/18* (2013.01); *H01F 27/22* (2013.01); *H02M 7/003* (2013.01)

(56) References Cited

U.S. PATENT DOCUMENTS

| | | | | |
|---|---|---|---|---|
| 6,114,934 | A * | 9/2000 | Ikeda | .................... H01F 29/146 |
| | | | | 315/400 |
| 2001/0030594 | A1* | 10/2001 | Abe | ...................... H01F 17/062 |
| | | | | 336/213 |
| 2013/0027163 | A1* | 1/2013 | Kosaka | ................... H01F 37/00 |
| | | | | 336/90 |
| 2013/0027164 | A1* | 1/2013 | Ooyama | ............... H01F 27/255 |
| | | | | 336/90 |
| 2016/0181007 | A1* | 6/2016 | Shiokawa | ............ H01F 17/062 |
| | | | | 336/221 |
| 2016/0189846 | A1* | 6/2016 | Miyauchi | ................ H01F 17/04 |
| | | | | 336/61 |

FOREIGN PATENT DOCUMENTS

| | | |
|---|---|---|
| JP | H11-238629 A | 8/1999 |
| JP | 2007-227640 A | 9/2007 |

OTHER PUBLICATIONS

PCT/ISA/237, "Written Opinion of the International Searching Authority for International Application No. PCT/JP2014/002795," Sep. 9, 2014.

PCT/IB/338, "Notification of Transmittal of Translation of the International Preliminary Report on Patentability for International Application No. PCT/JP2014/002795," Dec. 8, 2016.

PCT/IB/373, "International Preliminary Report on Patentability for International Application No. PCT/JP2014/002795," Nov. 29, 2016.

* cited by examiner

WINDING COMPONENT ATTACHMENT STRUCTURE AND POWER CONVERSION DEVICE PROVIDED WITH SAID ATTACHMENT STRUCTURE

CROSS-REFERENCE TO RELATED APPLICATION

This is a continuation application of PCT International Application No. PCT/JP2014/002795 filed on May 27, 2014.

TECHNICAL FIELD

The present invention relates to a winding component attachment structure to fix a winding component such as a reactor to a case, and a power conversion device provided with this attachment structure.

BACKGROUND ART

In a power conversion device such as an AC/DC converter mounted in a hybrid car, an electric car or the like, it is general that a winding component such as a reactor is disposed in a case and the winding component is fixed to the case. In this winding component attachment structure, the winding component has a comparatively large weight, and hence it is required that a vibration resistance after fixing the winding component to the case is excellent.

The reactor is a component including a ring-shaped core, and a coil alternately wound around and along an inner peripheral surface and an outer peripheral surface of this core.

As the attachment structure in which the reactor is attached to the case, for example, a structure described in Patent Literature 1 is known.

In the attachment structure of the reactor of Patent Literature 1, the reactor is disposed on an upper surface of the case, and at least two leaf spring attaching portions are disposed on the upper surface of the case to sandwich the reactor therebetween. Further, a leaf spring is disposed to cover an upper portion of the reactor, and both end portions of the leaf spring are attached to the leaf spring attaching portions to generate a spring force in the leaf spring, whereby the reactor is fixed while pressing the reactor toward the case with this leaf spring.

CITATION LIST

Patent Literature

PTL 1: JP 2007-227640 A

SUMMARY OF INVENTION

Technical Problem

Additionally, during preparation of a reactor, bend R is generated when bending a coil along corner portions of an upper surface and a lower surface of a core, and hence clearances are generated between the coil and each of the upper surface, the lower surface and an outer periphery of the core, thereby preparing the reactors having variable outer shape dimensions (a height dimension and an outer diameter dimension) for each product.

Here, when the reactor having a small outer shape dimension is fixed by an attachment structure of Patent Literature 1, a spring force of a leaf spring that presses the reactor weakens, and the reactor might be detached from the case by a vibration input.

Additionally, when the reactor having a large outer shape dimension is fixed by the attachment structure of Patent Literature 1, the spring force of the leaf spring excessively increases, so that the increased spring force might impart damage to the leaf spring and the reactor.

Therefore, the present invention has been developed to solve these problems, and objects thereof are to provide a winding component attachment structure in which a winding component such as a reactor having a different outer shape dimension for each product can securely be fixed to a case by improving vibration resistant characteristics even when the winding component is mounted in a hybrid car, an electric car or the like, and to provide a power conversion device provided with this attachment structure.

Solution to Problem

To achieve the above objects, a winding component attachment structure according to one aspect of the present invention is a winding component attachment structure in which a winding component is fixed to a case, which is formed by winding a coil around and along an inner peripheral surface and an outer peripheral surface of a ring-shaped core a plurality of times, the attachment structure includes a placing member made of an insulating material and fixed to a fixing surface of the case in a state where a lower surface of the winding component is placed, a pressing member made of an insulating material and disposed to abut on an upper surface of the winding component, and a pressing force imparting portion that couples the placing member with the pressing member and imparts a pressing force toward the fixing surface, from the pressing member to the winding component, and in the pressing force imparting portion, a distance between the placing member and the pressing member is variable in accordance with a height change of the winding component, a part of the lower surface of the winding component is installed on the placing member, and the winding component is fixed on the fixing surface side by pressing in a state that a bumper member absorbing vibration transmitted to the case is inserted, between another part of the lower surface Of the winding component and the fixing surface.

Additionally, in the winding component attachment structure according to the one aspect of the present invention, it is preferable that the pressing force imparting portion includes an external thread portion disposed in one of the placing member and the pressing member to extend toward the other member, and an internal thread portion disposed in the other member of the placing member and the pressing member and screwed into the one external thread portion; and a distance between the placing member and the pressing member is variable by changing a screwing position of the external thread portion into the internal thread portion.

In addition, in the winding component attachment structure according to the one aspect of the present invention, it is preferable that the placing member includes a lower positioning portion that projects upward to be inserted into a hollow portion of the winding component from a lower opening thereof, and the pressing member includes an upper positioning portion that projects downward to be inserted into the hollow portion of the winding component from an upper opening thereof.

Additionally, in the winding component attachment structure according to the one aspect of the present invention, it is preferable that at least two winding components are disposed in the form of a row on the placing member, and the pressing force imparting portion is disposed between the two adjacent winding components.

In addition, in the winding component attachment structure according to the one aspect of the present invention, it is preferable that the pressing force imparting portion has a function of positioning the winding component by passing through the hollow portion of the winding component.

Furthermore, in the winding component attachment structure according to the one aspect of the present invention, it is preferable that the cushioning material is a member excellent in thermal conductivity.

Additionally, a power conversion device according to the present invention is provided with the above winding component attachment structure.

Advantageous Effects of Invention

According to a winding component attachment structure of the present invention and a power conversion device provided with this attachment structure, a winding component such as a reactor having a different outer shape dimension for each product can securely be fixed to a case by improving vibration resistant characteristics even when the winding component is mounted in a hybrid car, an electric car or the like.

DESCRIPTION OF EMBODIMENTS

Modes to carry out the present invention (hereinafter referred to as embodiments) will now be described in detail with reference to the drawings.

Figure 1A:
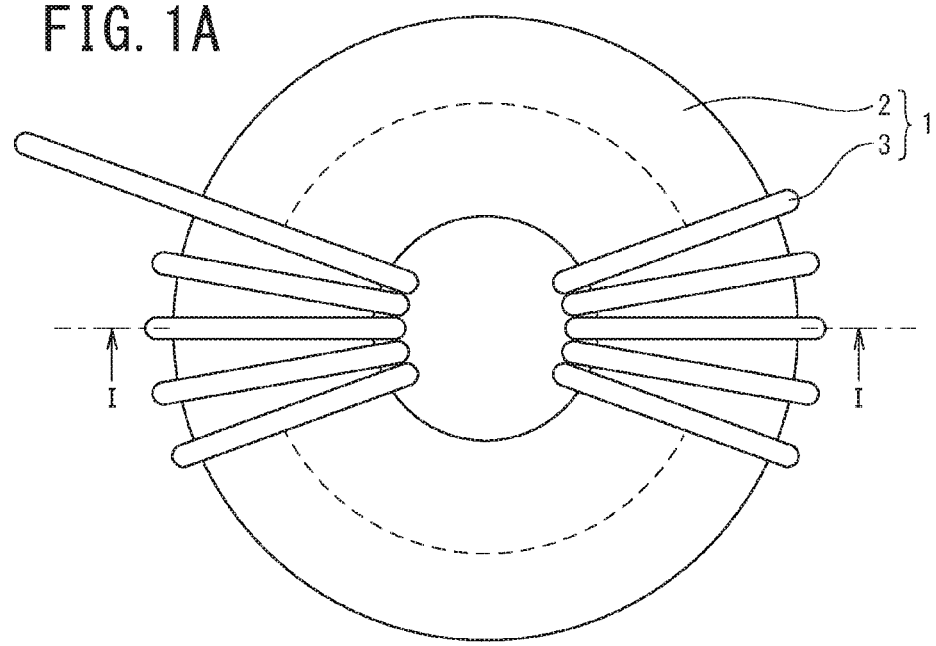
FIGS. 1A and 1B are views illustrative of a winding component such as a reactor according to the present invention.
Figure 1B:
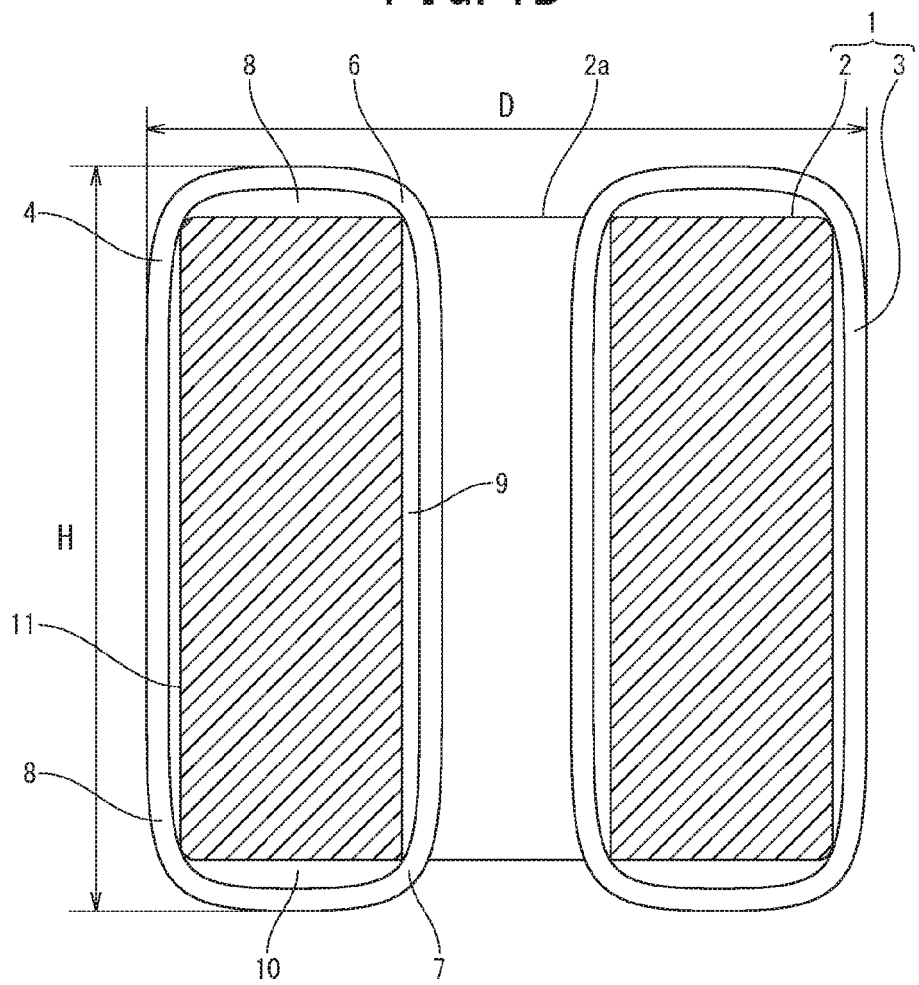

FIGS. 1A and 1B illustrate a reactor 1 as a winding component according to the present invention. The reactor 1 is a component including a ring-shaped core 2, and a coil 3 alternately wound around and along an inner peripheral surface and an outer peripheral surface of the core 2 a plurality of times.

During preparation of the reactor 1, as illustrated in FIG. 1B, bending radius portions 4 to 7 are generated when bending the coil 3 along corner portions on an inner diameter side and an outer diameter side of an upper surface 2a and a lower surface 2b of the core 2, and hence clearances 8 to 11 are generated between the coil and each of the upper surface, an inner periphery, the lower surface and an outer periphery of the core 2. Consequently, in the prepared reactor 1, an outer shape dimension (a height dimension H or an outer diameter dimension D) varies for each product.

The reactor 1 is mounted in a case, as a power conversion control unit of an AC/DC converter for a hybrid car or an electric car.

First Embodiment

Figure 2:
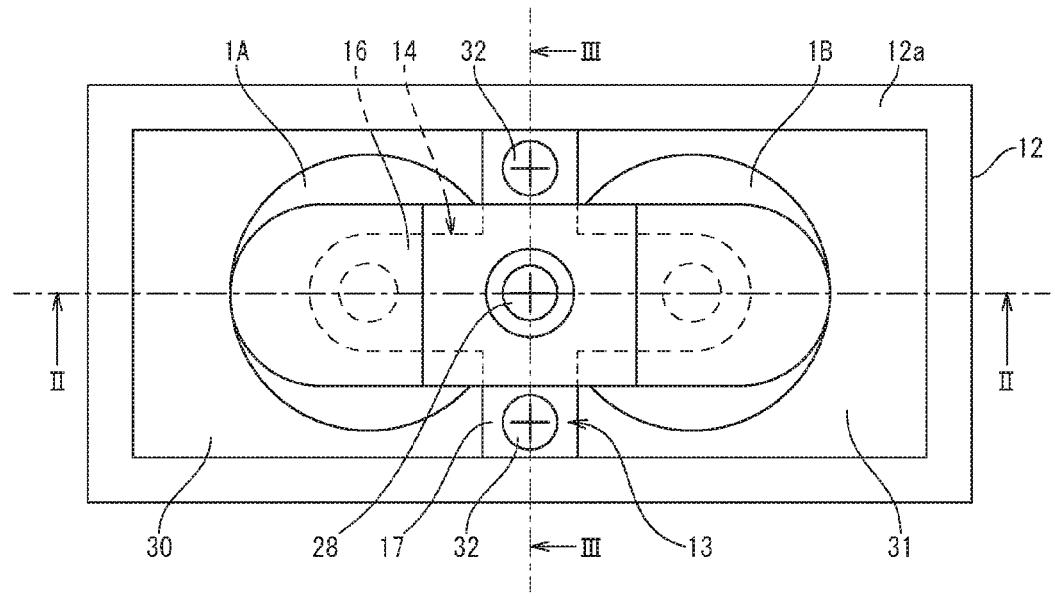
FIG. 2 is a plan view illustrative of a winding component attachment structure of a first embodiment according to the present invention.
Figure 3:
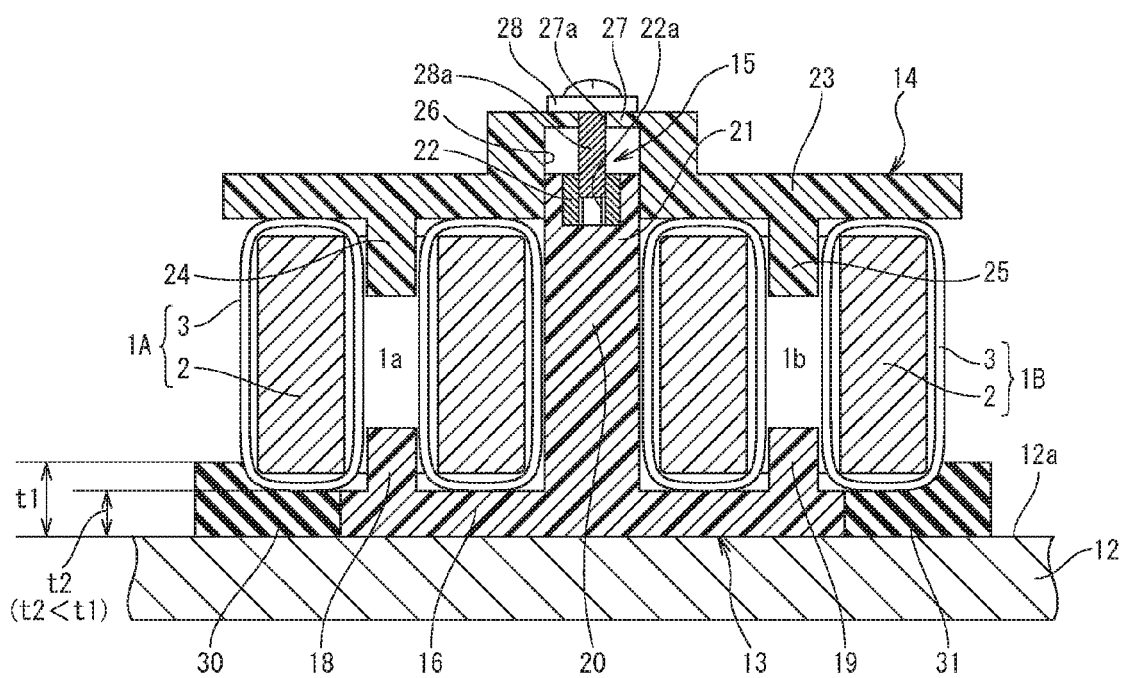
FIG. 3 is a view from an arrow direction of the II-II line of FIG. 2.
Figure 4:
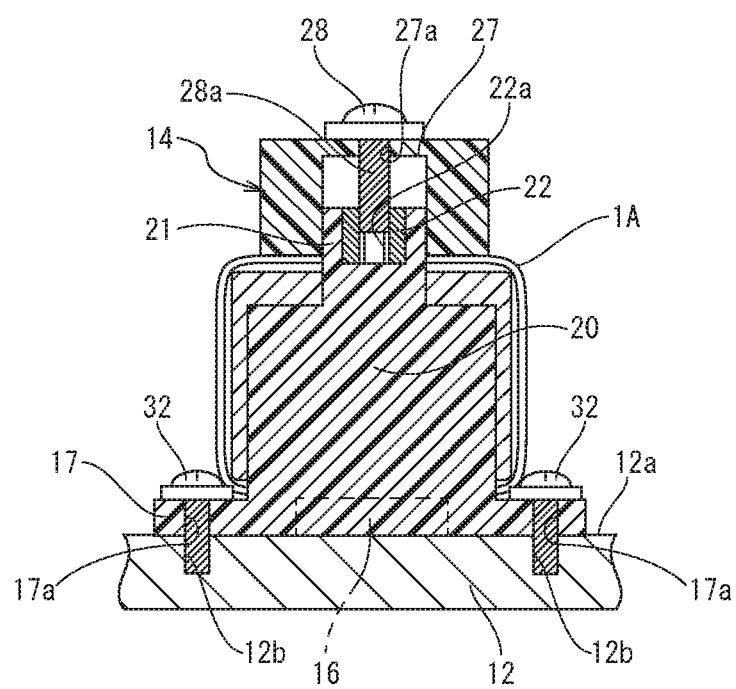
FIG. 4 is a view from an arrow direction of the line of FIG. 2.

FIG. 2 to FIG. 4 illustrate a winding component attachment structure of a first embodiment according to the present invention. FIG. 2 is a plan view illustrative of the winding component attachment structure, FIG. 3 is a view from an arrow direction of the II-II line of FIG. 2, and FIG. 4 is a view from an arrow direction of the line of FIG. 2.

According to the present embodiment, there is provided an attachment structure of two reactors 1A and 1B arranged in parallel and fixed to a component fixing surface 12a of a case 12 of an AC/DC converter, and the attachment structure includes a placing member 13 on which parts of lower surfaces of the two reactors 1A and 1B are placed, a pressing member 14 disposed to abut on upper surfaces of the two reactors 1A and 1B, a pressing force imparting portion 15 that imparts, from the pressing member 14 to the two reactors 1A and 1B, a downward pressing force toward the component fixing surface 12a, and heat transfer cushioning members 30 and 31 sandwiched between the component fixing surface 12a and the lower surfaces of the reactors 1A and 1B.

The placing member 13 is made of an insulating material such as a synthetic resin, and as illustrated in FIG. 3, the placing member includes a receiving portion 16 that extends between positions to close lower openings of hollow portions 1a and 1b of the two reactors 1A and 1B arranged in parallel to receive parts of the lower surfaces of the reactors 1A and 1B, a fixing portion 17 that extends to the receiving portion 16 in the form of a cross (see FIG. 2), positioning portions 18 and 19 which project from an upper surface of the receiving portion 16 and are inserted into the lower openings of the hollow portions 1a and 1b of the two reactors 1A and 1B, respectively, a wall portion 20 that rises from a central portion of the upper surface of the receiving portion 16 between positions where the two reactors 1A and 1B are disposed, and a coupling pillar 21 that projects from an upper portion (see FIG. 4) of the wall portion 20.

Further, in a top portion of the coupling pillar 21, there is embedded a metal tube 22 in which an internal thread portion 22a is formed in an inner peripheral surface.

As illustrated in FIG. 4, screw through holes 17a are formed in the fixing portion 17, and fixing screws 32 inserted into the screw through holes 17a are screwed from the component fixing surface 12a into screw holes 12b formed in the case 12, whereby the placing member 13 is fixed to the component fixing surface 12a.

The pressing member 14 is also made of an insulating material such as a synthetic resin, and as illustrated in FIG.

3, the pressing member includes a pressing portion 23 that uniformly abuts on the upper surfaces of the two reactors 1A and 1B, positioning portions 24 and 25 which project from a lower surface of the pressing portion 23 and are inserted into upper openings of the hollow portions 1a and 1b of the two reactors 1A and 1B, respectively, and an engaging concave portion 26 formed so that a central portion of the pressing portion 23 expands upwardly. In a top plate 27 in which the engaging concave portion 26 is formed, a screw through hole 27a is formed, and an external thread portion 28a of a coupling screw 28 is inserted into the screw through hole 27a from the upside of the hole.

Here, the pressing force imparting portion 15 of the present embodiment includes the external thread portion 28a of the coupling screw 28 disposed to engage in the engaging concave portion 26 of the pressing member 14, and the internal thread portion 22a disposed in the top portion of the coupling pillar 21 of the placing member 13 so that the external thread portion 28a is screwed into the internal thread portion. Additionally, lower positioning portions according to the present invention correspond to the positioning portions 18 and 19, and upper positioning portions according to the present invention correspond to the positioning portions 24 and 25.

Additionally, the heat transfer cushioning members 30 and 31 are made of an insulating material such as silicon that is excellent in thermal conductivity and has an elasticity, and as illustrated in FIG. 2 and FIG. 3, the heat transfer cushioning members are disposed on the component fixing surface 12a while surrounding a periphery of the receiving portion 16 of the placing member 13.

A thickness t1 of the heat transfer cushioning members 30 and 31 is set to be larger than a plate thickness t2 of the receiving portion 16 of the placing member 13 on which the lower surfaces of the reactors 1A and 1B are placed (t1>t2).

Next, there will be described a procedure of fixing the two reactors 1A and 1B to the component fixing surface 12a.

First, the screw through holes 17a formed in the fixing portion 17 of the placing member 13 are disposed to face the screw holes 12b formed in the case 12, and the fixing screws 32 inserted into the screw through holes 17a are screwed into the screw holes 12b, thereby fixing the placing member 13 to the component fixing surface 12a.

Additionally, the heat transfer cushioning members 30 and 31 having the thickness t1 are disposed on the component fixing surface 12a while surrounding the periphery of the receiving portion 16 of the placing member 13.

Next, the positioning portion 18 of the placing member 13 is inserted into the lower opening of the hollow portion 1a of one reactor 1A, and a part of the lower surface of the reactor 1A is placed on the heat transfer cushioning member 30 disposed on a positioning portion 18 side of the placing member 13. Additionally, the positioning portion 19 of the placing member 13 is inserted into the lower opening of the hollow portion 1b of the other reactor 1B, and a part of the lower surface of the reactor 1B is placed on the heat transfer cushioning member 31 disposed on a positioning portion 19 side of the placing member 13.

Next, the pressing member 14 is disposed on the upper surfaces of the reactors 1A and 1B in a state where the positioning portions 24 and 25 are inserted into the upper openings of the hollow portions 1a and 1b of the two reactors 1A and 1B disposed on the placing member 13.

Next, the coupling screw 28 constituting the pressing force imparting portion 15 is inserted downwardly through the through hole 27a formed in the engaging concave portion 26 of the pressing member 14, and the external thread portion 28a of the coupling screw 28 is screwed into the internal thread portion 22a disposed in the top portion of the coupling pillar 21 of the placing member 13.

Further, a screwed state of the external thread portion 28a of the coupling screw 28 and the internal thread portion 22a of the placing member 13 is adjusted, and a distance between the pressing member 14 and the placing member 13 is set to a predetermined value, thereby fixing the two reactors 1A and 1B in a state of being pressed toward the case 12. At this time, the heat transfer cushioning members 30 and 31, which abut on the lower surfaces of the reactors 1A and 1B to be sandwiched between the lower surfaces and the component fixing surface 12a, are compressed down to a thickness equal to the plate thickness t2 of the receiving portion 16 of the placing member 13 as illustrated in FIG. 3.

Next, effects of the present embodiment will be described.

According to the attachment structure of the reactors of the present embodiment, even the reactors 1A and 1B having outer shape dimensions which are easy to vary for each product can securely be fixed to the case 12, because the distance between the placing member 13 and the pressing member 14 is variable in accordance with a height change of each of the reactors 1A and 1B.

That is, when a height dimension H of the two reactors 1A and 1B is high, the pressing force imparting portion 15 increases the distance between the placing member 13 and the pressing member 14, and when the height dimension H of the reactors 1A and 1B is low, the pressing force imparting portion 15 decreases the distance between the placing member 13 and the pressing member 14, thereby fixing the reactors 1A and 1B to the case 12 with an optimum pressing force. Therefore, in the present embodiment, the two reactors 1A and 1B for use as power conversion control units of a power conversion device mounted in a hybrid car or an electric car can securely be fixed to the case 12 by improving the vibration resistant characteristics.

Additionally, the heat transfer cushioning members 30 and 31 are sandwiched in the compressed state between the lower surfaces of the reactors 1A and 1B which are not placed on the receiving portion 16 of the placing member 13 and the component fixing surface 12a, so that a vibration transmitted to the case 12 is easy to be absorbed by the heat transfer cushioning members 30 and 31, and the vibration resistant characteristics can further improve.

In addition, also when an amount of heat to be generated by the reactors 1A and 1B is large, the heat transfer cushioning members 30 and 31 are brought into contact closely with the reactors 1A and 1B and the case 12 so that a heat transfer area between each reactor and the case increases, and hence the heat generated by the reactors 1A and 1B is transferred to the case 12 via the heat transfer cushioning members 30 and 31 and radiated. Therefore, even when the amount of the heat to be generated by the reactors 1A and 1B is large, it is possible to efficiently cool the reactors 1A and 1B.

Additionally, in the present embodiment, the placing member 13 and the heat transfer cushioning members 30 and 31, which are made of the insulating material, are disposed between the case 12 and the coils 3 of the reactors 1A and 1B, and hence an insulating distance can sufficiently be acquired between the case 12 and the coil 3.

In addition, only by inserting the positioning portions 18 and 19 of the placing member 13 and the positioning portions 24 and 25 of the pressing member 14 into the hollow portions 1a and 1b of the two reactors 1A and 1B, positioning of the reactors 1A and 1B to the placing member 13 and the pressing member 14 is completed, and hence an attaching operation of the reactors 1A and 1B can easily be performed.

Furthermore, in the pressing force imparting portion 15 of the present embodiment, the distance between the pressing member 14 and the placing member 13 can be varied by adjusting a screwing length of the external thread portion 28a of the coupling screw 28 into the internal thread portion 22a of the placing member 13, and hence simplification of the reactor attachment structure can be achieved.

Second Embodiment

Figure 5:
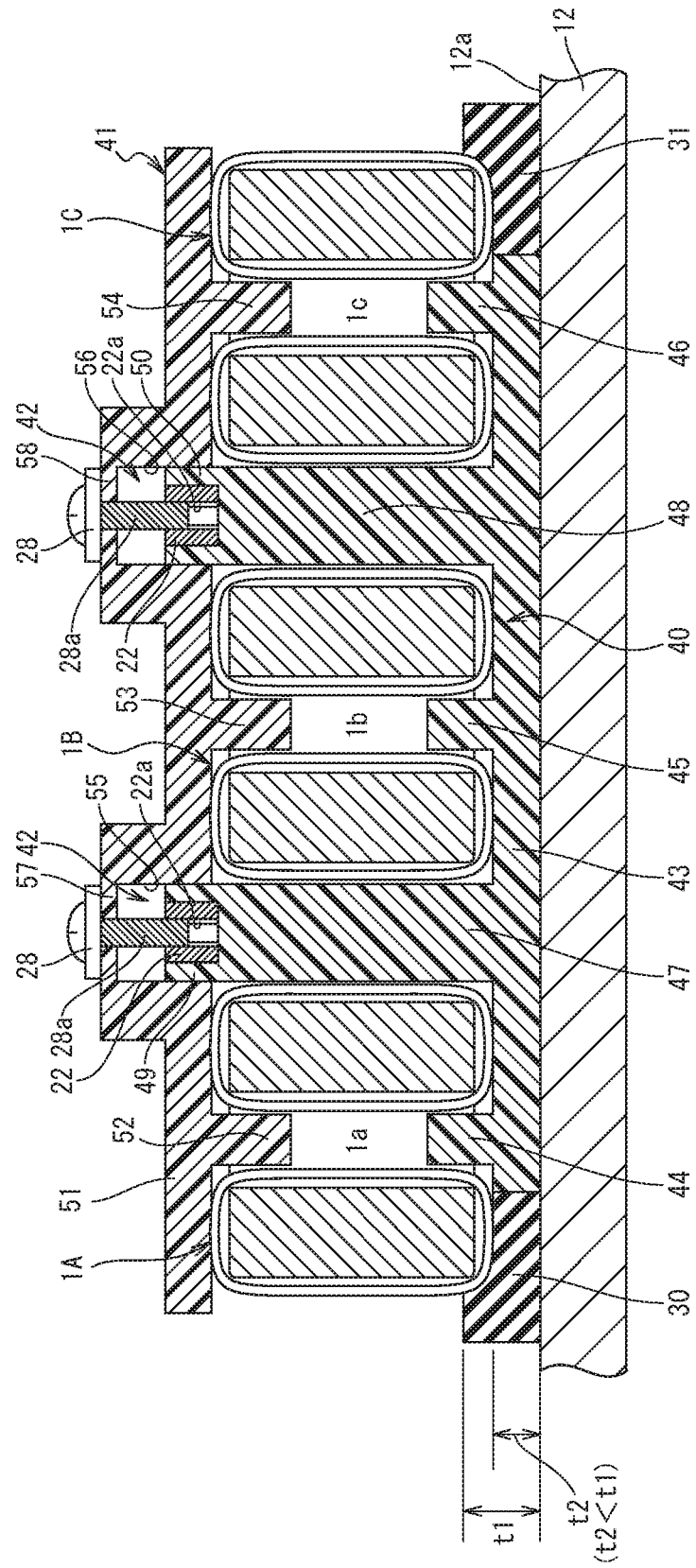
FIG. 5 is a view illustrative of a winding component attachment structure of a second embodiment according to the present invention.

Next, FIG. 5 illustrates a winding component attachment structure of a second embodiment according to the present invention. It is to be noted that a constitution similar to the first embodiment is denoted with the same reference signs and the description is omitted.

According to the present embodiment, there is provided an attaching structure in which three reactors 1A, 1B and 1C are arranged in series and fixed to a component fixing surface 12a of a case 12 of an AC/DC converter, and the attachment structure includes a placing member 40, a pressing member 41, two pressing force imparting portions 42 and 42, and heat transfer cushioning members 30 and 31 sandwiched between the component fixing surface 12a and lower surfaces of the reactors 1A and 1C.

The placing member 40 is made of an insulating material such as a synthetic resin, and includes a receiving portion 43 that extends between positions to close lower openings of hollow portions 1a and 1c of the reactors 1A and 1C of both ends in the three arranged reactors 1A to 1C and receives the whole region of a lower surface of the reactor 1B and parts of the lower surfaces of the reactors 1A and 1C, a fixing portion (not illustrated) that fixes the receiving portion 43 to the component fixing surface 12a, positioning portions 44 to 46 which project from an upper surface of the receiving portion 43 and are inserted into the lower opening of the hollow portions 1a to 1c of the three reactors 1A to 1C, respectively, wall portions 47 and 48 each of which rises from a portion of the receiving portion 43 corresponding to an interval of the location where three reactors 1A to 1C are disposed, and coupling pillars 49 and 50 which project from upper portions of the wall portions 47 and 48. Further, in each of top portions of the coupling pillars 49 and 50, there is embedded a metal tube 22 in which an internal thread portion 22a is formed in an inner peripheral surface.

The pressing member 41 is also made of an insulating material such as a synthetic resin, and includes a pressing portion 51 that uniformly abuts on upper surfaces of the three reactors 1A to 1C, positioning portions 52 to 54 which project from a lower surface of the pressing portion 51 and are inserted into upper openings of the hollow portions 1a to 1c of the three reactors 1A to 1C, respectively, and engaging concave portions 55 and 56 formed so that central portions of the pressing portion 51 between the positioning portions 52 to 54 expand upwardly. Further, in top plates 57 and 58 of the engaging concave portions 55 and 56, screw through holes are formed, and external thread portions 28a of coupling screws 28 are inserted into the screw through holes from the upside of the holes.

Here, the two pressing force imparting portions 42 and 42 of the present embodiment include the external thread portions 28a of the coupling screws 28 disposed to engage with the two engaging concave portions 55 and 56 of the pressing member 41, and the internal thread portions 22a disposed in the top portions of the two coupling pillars 49 and 50 of the placing member 40 so that the external thread portions 28a are screwed into the internal thread portions.

Additionally, the heat transfer cushioning members 30 and 31 of the present embodiment are disposed on the component fixing surface 12a while surrounding a periphery of the receiving portion 43 of the placing member 40, and similarly to the first embodiment, a thickness t1 of the heat transfer cushioning members 30 and 31 is set to be larger than a plate thickness t2 of the receiving portion 43 on which the lower surfaces of the reactors 1A and 1C are disposed (t1>t2).

Further, when screwed states of the external thread portions 28a of the coupling screws 28 of the two pressing force imparting portions 42 and 42 and the internal thread portions 22a of the placing member 40 are adjusted and a distance between the pressing member 41 and the placing member 40 is set to a predetermined value to fix the three reactors 1A to 1C in a state of being pressed toward the case 12, the heat transfer cushioning members 30 and 31, which abut on the lower surfaces of the reactors 1A and 1C to be sandwiched between the lower surfaces and the component fixing surface 12a, are compressed down to a thickness equal to the plate thickness t2 of the receiving portion 43 of the placing member 40.

According to the attachment structure of the reactors of the present embodiment, when a height dimension H of the three reactors 1A to 1C is high, the two pressing force imparting portions 42 and 42 increase the distance between the placing member 40 and the pressing member 41, and when the height dimension H of the reactors 1A to 1C is low, the pressing force imparting portions 42 and 42 decrease the distance between the placing member 40 and the pressing member 41, whereby the three reactors 1A to 1C can be fixed to the case 12 with an optimum pressing force. Therefore, also in the present embodiment, the three reactors 1A to 1C for use as power conversion control units of a power conversion device mounted in a hybrid car or an electric car can securely be fixed to the case 12 by improving vibration resistant characteristics.

Additionally, the heat transfer cushioning members 30 and 31 are sandwiched in the compressed state between the lower surfaces of the reactors 1A and 1C which are not placed on the receiving portion 43 of the placing member 40 and the component fixing surface 12a, so that a vibration transmitted to the case 12 is easy to be absorbed by the heat transfer cushioning members 30 and 31, and the vibration resistant characteristics can further improve.

In addition, also when an amount of heat to be generated by the reactors 1A to 1C is large, the heat transfer cushioning members 30 and 31 are brought into contact closely with the reactors 1A and 1C and the case 12 so that a heat transfer area between each reactor and the case increases, and hence the heat generated by the reactors 1A and 1C is transferred to the case 12 via the heat transfer cushioning members 30 and 31 and then radiated. Therefore, it is possible to efficiently cool the reactors 1A to 1C.

Additionally, also in the present embodiment, the placing member 40 and the heat transfer cushioning members 30 and 31, which are made of the insulating material, are disposed between the case 12 and coils 3 of the reactors 1A to 1C, and hence an insulating distance can sufficiently be acquired between the case 12 and each coil 3.

Additionally, only by inserting the positioning portions 44 to 46 of the placing member 40 and the positioning portions 52 to 54 of the pressing member 41 into the hollow portions 1a to 1c of the three reactors 1A to 1C, positioning of the reactors 1A to 1C to the placing member 40 and the pressing member 41 is completed, and hence an attaching operation of the reactors 1A to 1C can easily be performed.

Third Embodiment

Figure 6:
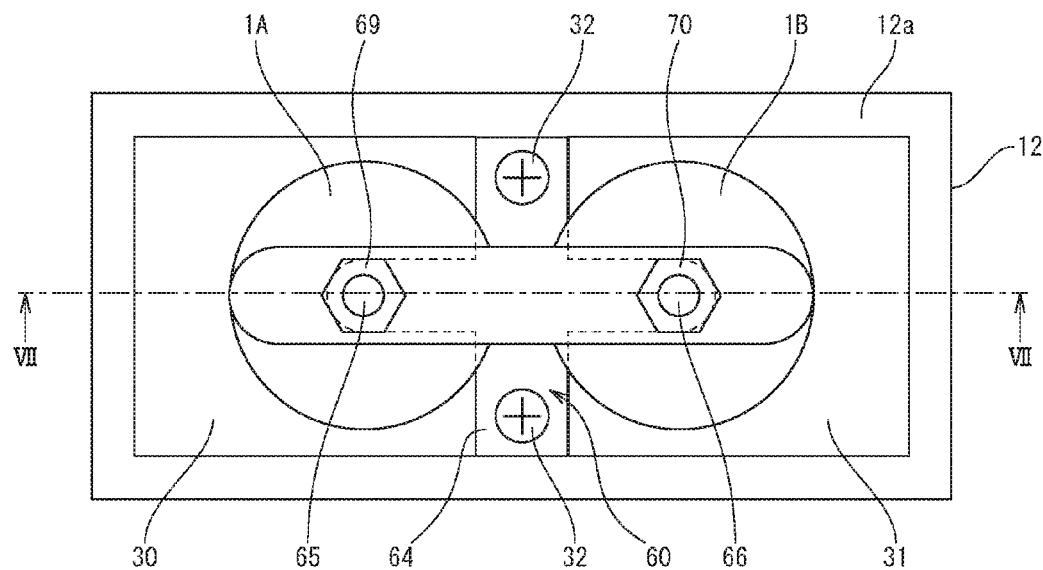
FIG. 6 is a plan view illustrative of a winding component attachment structure of a third embodiment according to the present invention.
Figure 7:
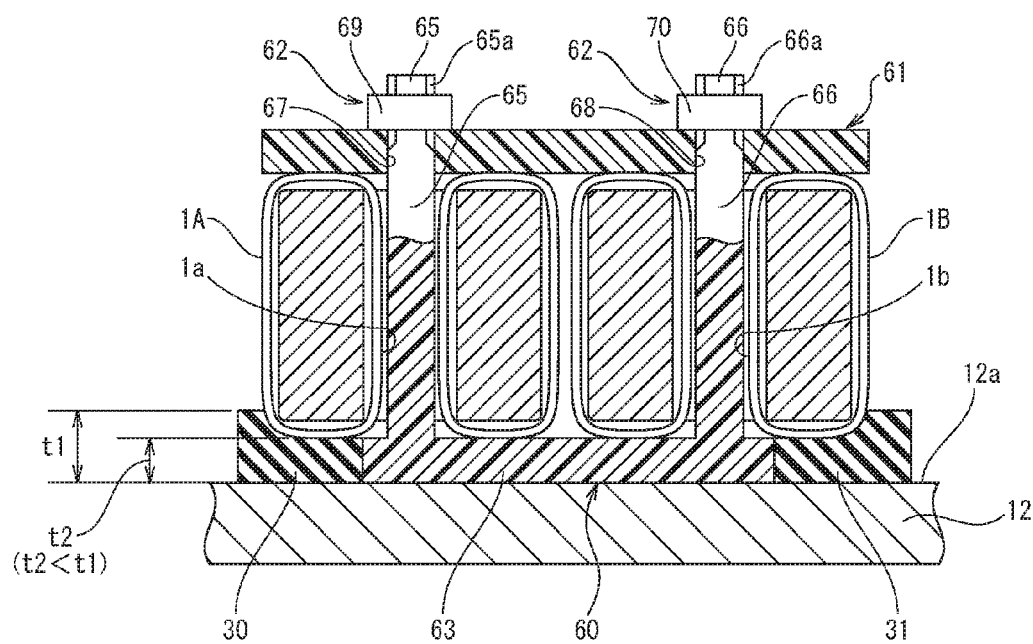
FIG. 7 is a view from an arrow direction of the VII-VII line of FIG. 6.

Next, FIG. 6 and FIG. 7 illustrate a winding component attachment structure of a third embodiment according to the present invention, FIG. 6 is a plan view, and FIG. 7 is a view from an arrow direction of the VII-VII line of FIG. 6.

According to the present embodiment, there is provided an attachment structure in which two reactors 1A and 1B are arranged in parallel and fixed to a component fixing surface 12a of a case 12 of an AC/DC converter, and the attachment structure includes a placing member 60 on which parts of lower surfaces of two reactors 1A and 1B are placed, a pressing member 61 disposed to abut on upper surfaces of the two reactors 1A and 1B, pressing force imparting portions 62 and 62 which impart, from the pressing member 61 to the two reactors 1A and 1B, a downward pressing force toward the component fixing surface 12a, and heat transfer cushioning members 30 and 31 sandwiched between the component fixing surface 12a and the lower surfaces of the reactors 1A and 1B.

The placing member 60 is made of an insulating material such as a synthetic resin, and as illustrated in FIG. 7, the placing member includes a receiving portion 63 that extends between positions to close lower openings of hollow portions 1a and 1b of the two reactors 1A and 1B arranged in parallel, to receive the parts of the lower surfaces of the reactors 1A and 1B, a fixing portion 64 that extends to the receiving portion 63 in the form of a cross (see FIG. 6), and two positioning coupling pillars 65 and 66 which project from an upper surface of the receiving portion 63 and extend through the hollow portions 1a and 1b of the two reactors 1A and 1B from the lower openings, and in upper outer peripheries of the positioning coupling pillars 65 and 66, external thread portions 65a and 66a are formed.

The pressing member 61 is made of an insulating material such as a synthetic resin, and as illustrated in FIG. 7, the pressing member is a plate-shaped member that uniformly abuts on the upper surfaces of the two reactors 1A and 1B, and there are formed two inserting holes 67 and 68 through which the positioning coupling pillars 65 and 66 mentioned above pass.

Additionally, the heat transfer cushioning members 30 and 31 are disposed on the component fixing surface 12a while surrounding a periphery of the receiving portion 63 of the placing member 60, and a thickness t1 of the heat transfer cushioning members 30 and 31 is set to be larger than a plate thickness t2 of the receiving portion 63 of the placing member 60 (t1>t2).

Next, in the present embodiment, there will be described a procedure of fixing the two reactors 1A and 1B to the component fixing surface 12a.

First, the fixing portion 64 of the placing member 60 is fixed to the component fixing surface 12a by use of fixing screws 32. Further, the heat transfer cushioning members 30 and 31 having the thickness t1 are disposed on the component fixing surface 12a while surrounding the periphery of the receiving portion 63 of the placing member 60.

Next, the two reactors 1A and 1B are disposed in a state where the positioning coupling pillars 65 and 66 of the placing member 60 are inserted into the hollow portions 1a and 1b.

Next, the positioning coupling pillars 65 and 66 projected from the hollow portions 1a and 1b of the two reactors 1A and 1B are inserted into the two inserting holes 67 and 68 of the pressing member 61, and nuts 69 and 70 are screwed into external thread portions 65a and 66a of the positioning coupling pillars 65 and 66 projected from the pressing member 61, respectively.

Further, screwed states of the external thread portions 65a and 66a of the positioning coupling pillars 65 and 66 and the nuts 69 and 70 are adjusted, and a distance between the pressing member 61 and the placing member 60 is set to a predetermined value, thereby fixing the two reactors 1A and 1B in a state of being pressed toward the case 12. At this time, the heat transfer cushioning members 30 and 31, which abut on the lower surfaces of the reactors 1A and 1B to be sandwiched between the lower surfaces and the component fixing surface 12a, are compressed down to a thickness equal to the plate thickness t2 of the receiving portion 63 of the placing member 60 as illustrated in FIG. 7.

It is to be noted that the pressing force imparting portions 62 and 62 of the present embodiment include the external thread portions 65a and 66a of the positioning coupling pillars 65 and 66 and the nuts 69 and 70.

According to the attachment structure of the reactors of the present embodiment, when a height dimension H of the two reactors 1A and 1B is high, the pressing force imparting portions 62 and 62 increase the distance between the pressing member 61 and the placing member 60, and when the height dimension H of the reactors 1A and 1B is low, the pressing force imparting portions 62 and 62 decrease the distance between the pressing member 61 and the placing member 60, thereby fixing the reactors 1A and 1B to the case 12 with an optimum pressing force. Therefore, also in the present embodiment, the two reactors 1A and 1B for use as power conversion control units of a power conversion device mounted in a hybrid car or an electric car can securely be fixed to the case 12 by improving vibration resistant characteristics.

Additionally, the heat transfer cushioning members 30 and 31 are sandwiched in the compressed state between the lower surfaces of the reactors 1A and 1B which are not placed on the receiving portion 63 of the placing member 60 and the component fixing surface 12a, so that a vibration transmitted to the case 12 is easy to be absorbed by the heat transfer cushioning members 30 and 31, and the vibration resistant characteristics can further improve.

Additionally, also when an amount of heat to be generated by the reactors 1A and 1B is large, the heat transfer cushioning members 30 and 31 are brought into contact closely with the reactors 1A and 1B and the case 12 so that a heat transfer area between each reactor and the case increases, and hence the heat generated by the reactors 1A and 1B is transferred to the case 12 via the heat transfer cushioning members 30 and 31 and radiated. Therefore, even when the amount of the heat to be generated by the reactors 1A and 1B is large, it is possible to efficiently cool the reactors 1A and 1B.

Additionally, in the present embodiment, the placing member 60 and the heat transfer cushioning members 30 and 31, which are made of the insulating material, are disposed between the case 12 and coils 3 of the reactors 1A and 1B, and hence an insulating distance can sufficiently be acquired between the case 12 and each coil 3.

In addition, the positioning coupling pillars 65 and 66 of the placing member 60 function as positioning members of the hollow portions 1a and 1b of the two reactors 1A and 1B and as fixing members of the pressing member 61, and hence simplification of the reactor attachment structure can be achieved.

Fourth Embodiment

Figure 8:
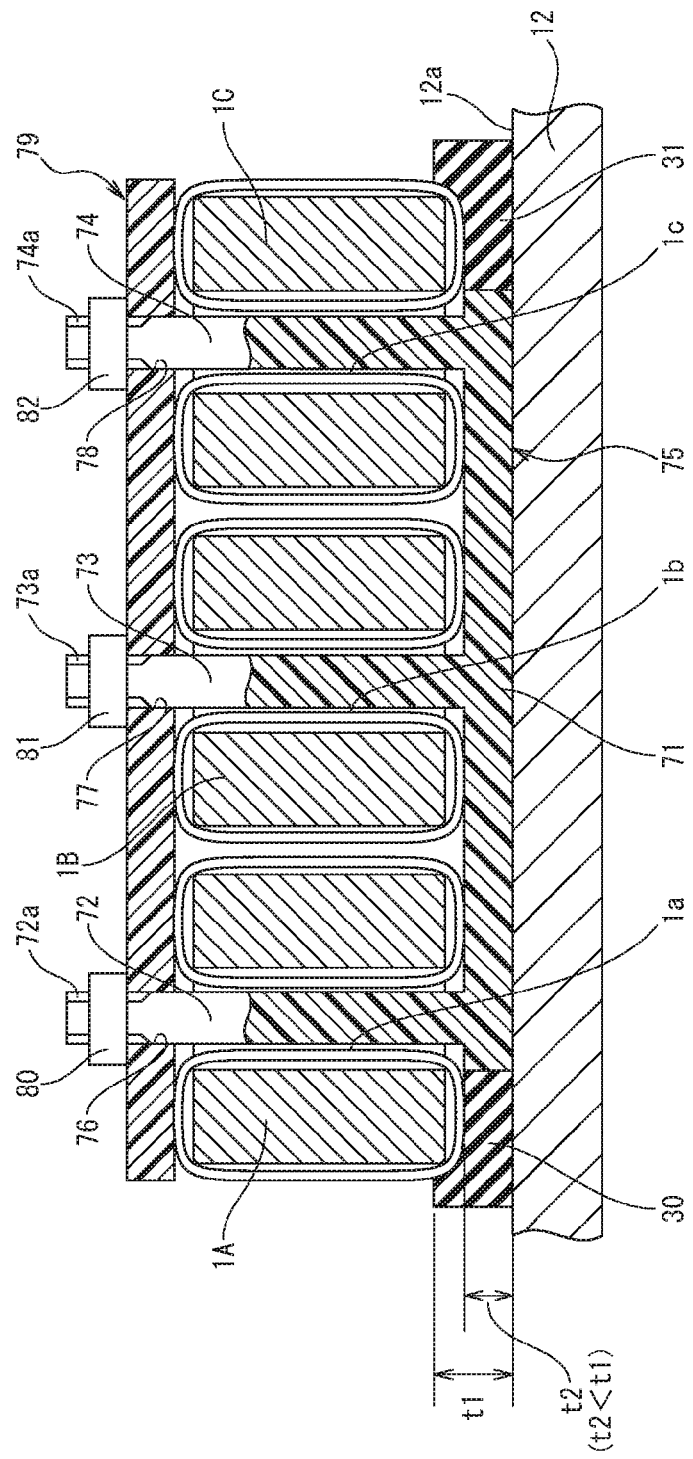
FIG. 8 is a view illustrative of a winding component attachment structure of a fourth embodiment according to the present invention.

Next, FIG. 8 illustrates a winding component attachment structure of a fourth embodiment according to the present invention, and by the attachment structure, three reactors 1A, 1B and 1C are arranged in series and fixed.

In the present embodiment, the attachment structure includes a placing member 75 on which three positioning coupling pillars 72 to 74 rise from a receiving portion 71, a pressing member 79 in which three inserting holes 76 to 78 are formed so that the positioning coupling pillars 72 to 74 pass therethrough, nuts 80, 81 and 82 which pass through the inserting holes 76 to 78 to be screwed into external thread portions 72a, 73a and 74a of the positioning coupling pillars 72 to 74 extended to an upper portion of the pressing member 79, and heat transfer cushioning members 30 and 31 sandwiched between a component fixing surface 12a and lower surfaces of the reactors 1A and 1C.

It is to be noted that a pressing force imparting portion according to the present invention includes the external thread portions 72a, 73a and 74a of the positioning coupling pillars 72 to 74, and the nuts 80, 81 and 82.

According to the attachment structure of the reactors of the present embodiment, similarly to the second embodiment, the three reactors 1A to 1C for use as power conversion control units of a power conversion device mounted in a hybrid car or an electric car can securely be fixed to a case 12 by improving vibration resistant characteristics.

Additionally, the heat transfer cushioning members 30 and 31 are sandwiched in a compressed state between the lower surfaces of the reactors 1A and 1C which are not placed on the receiving portion 71 of the placing member 75 and the component fixing surface 12a, so that a vibration transmitted to the case 12 is easy to be absorbed by the heat transfer cushioning members 30 and 31, and the vibration resistant characteristics can further improve.

In addition, also when an amount of heat to be generated by the reactors 1A to 1C is large, the heat transfer cushioning members 30 and 31 are brought into contact closely with the reactors 1A and 1C and the case 12 so that a heat transfer area between each reactor and the case increases, and hence the heat generated by the reactors 1A and 1C is transferred to the case 12 via the heat transfer cushioning members 30 and 31 and then radiated. Therefore, it is possible to efficiently cool the reactors 1A to 1C.

Furthermore, the three positioning coupling pillars 72 to 74 of the placing member 75 function as positioning members of hollow portions 1a, 1b and 1c of the three reactors 1A to 1C and as fixing members of the pressing member 79, and hence simplification of the reactor attachment structure can be achieved.

Fifth Embodiment

Figure 9:
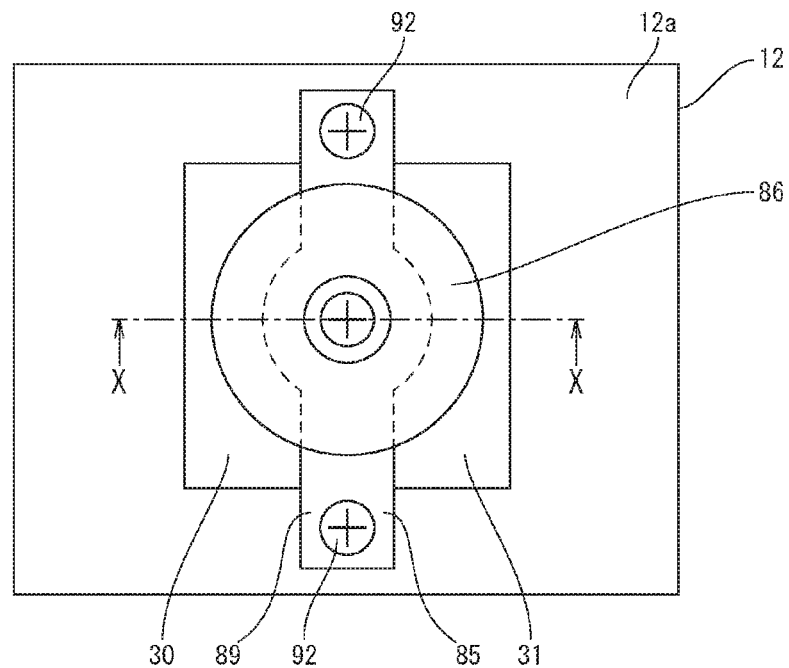
FIG. 9 is a plan view illustrative of a winding component attachment structure of a fifth embodiment according to the present invention.
Figure 10:
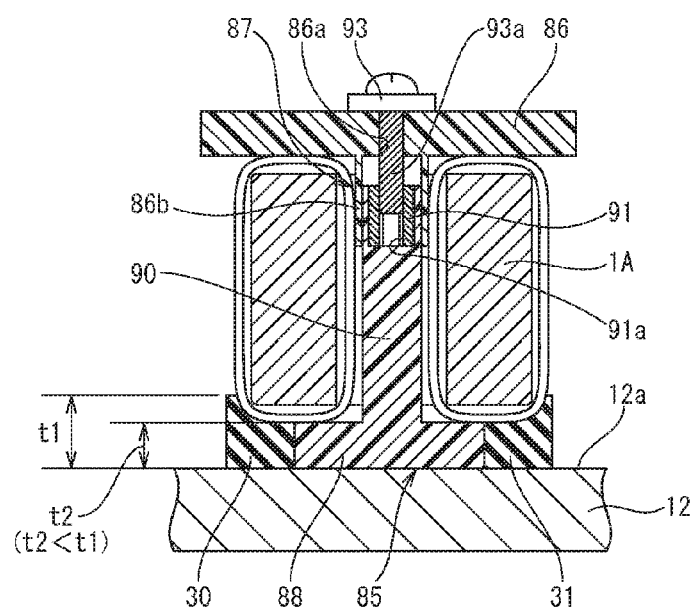
FIG. 10 is a view from an arrow direction of the X-X line of FIG. 9.

Next, FIG. 9 and FIG. 10 illustrate a winding component attachment structure of a fifth embodiment according to the present invention, FIG. 9 is a plan view, and FIG. 10 is a view from an arrow direction of the X-X line of FIG. 9.

According to the present embodiment, there is provided an attachment structure in which one reactor 1A is fixed to a component fixing surface 12a of a case 12 of an AC/DC converter, and the attachment structure includes a placing member 85 on which a part of a lower surface of the reactor 1A is placed, a pressing member 86 disposed to abut on an upper surface of the reactor 1A, a pressing force imparting portion 87 that imparts, from the pressing member 86 to the reactor 1A, a downward pressing force toward a component fixing surface 12a, and heat transfer cushioning members 30 and 31 sandwiched between the component fixing surface 12a and the lower surface of the reactor 1A.

The placing member 85 is made of an insulating material such as a synthetic resin, and includes a receiving portion 88 that receives a lower surface central side of the reactor 1A, a fixing portion 88 that extends perpendicularly to a plane direction of the receiving portion 88, and a positioning coupling pillar 90 that projects from an upper surface of the receiving portion 889 and is inserted from a lower opening of a hollow portion 1a of the reactor 1A close to an upper opening thereof, and in a top portion of the positioning coupling pillar 90, there is embedded a metal tube 91 in which an internal thread portion 91a is formed in an inner peripheral surface. Additionally, the fixing portion 89 of the placing member 85 is fixed to the component fixing surface 12a via fixing screws 92.

The pressing member 86 is also a plate member made of an insulating material such as a synthetic resin, a screw through hole 86a is formed in a central portion of the pressing member 86, and a cylindrical insulating portion 86b is formed to project from a lower surface position as a concentric circle position in the screw through hole 86a. Further, an external thread portion 93a of a coupling screw 93 is inserted from the upside into the screw through hole 86a of the pressing member 86.

Here, the pressing force imparting portion 87 of the present embodiment includes the external thread portion 93a of the coupling screw 93 inserted into the screw through hole 86a of the pressing member 86, and the internal thread portion 91a disposed in the top portion of the positioning coupling pillar 90 of the placing member 85 so that the external thread portion 93a is screwed into the internal thread portion.

Next, there will be described a procedure of fixing the one reactor 1A to the component fixing surface 12a.

First, the fixing portion 89 of the placing member 85 is fixed to the component fixing surface 12a by use of the fixing screws 92. Further, the heat transfer cushioning members 30 and 31 having a thickness t1 are disposed on the component fixing surface 12a while surrounding a periphery of the receiving portion 88 of the placing member 85.

Next, the reactor 1A is disposed in a state where the positioning coupling pillar 90 of the placing member 85 is inserted into the hollow portion 1a.

Next, the external thread portion 93a of the coupling screw 93 of the pressing member 86 and the cylindrical insulating portion 86b are inserted into the hollow portion 1a of the reactor 1A. Further, the external thread portion 93a of the coupling screw 93 is screwed into the internal thread portion 91a while surrounding an upper portion outer periphery of the positioning coupling pillar 90 with the cylindrical insulating portion 86b.

Further, a screwed state of the internal thread portion 91a of the positioning coupling pillar 90 and the external thread portion 93a of the coupling screw 93 is adjusted, and a distance between the pressing member 86 and the placing member 85 is set to a predetermined value, thereby fixing the reactor 1A in a state of being pressed toward a case 12. At this time, the heat transfer cushioning members 30 and 31, which abut on the lower surface of the reactor 1A to be sandwiched between the lower surface and the component fixing surface 12a, are compressed down to a thickness equal to a plate thickness t2 of the receiving portion 88 of the placing member 85.

Next, effects of the present embodiment will be described.

In the attachment structure of the reactor of the present embodiment, when a height dimension H of the reactor 1A is high, the pressing force imparting portion 87 increases the distance between the pressing member 86 and the placing member 85, and when the height dimension H of the reactor 1A is low, the pressing force imparting portion 87 decreases the distance between the pressing member 86 and the placing member 85, thereby fixing the reactor 1A to the case 12 with an optimum pressing force. Therefore, in the present embodiment, the one reactor 1A for use as a power conversion control unit of a power conversion device mounted in a hybrid car or an electric car can securely be fixed to the case 12 by improving vibration resistant characteristics.

Additionally, the heat transfer cushioning members 30 and 31 are sandwiched in a compressed state between the lower surface of the reactor 1A which is not placed on the receiving portion 88 of the placing member 85 and the component fixing surface 12a, so that a vibration transmitted to the case 12 is easy to be absorbed by the heat transfer cushioning members 30 and 31, and the vibration resistant characteristics can further improve.

In addition, also when an amount of heat to be generated by the reactor 1A is large, the heat transfer cushioning members 30 and 31 are brought into contact closely with the reactor 1A and the case 12 so that a heat transfer area between the reactor and the case increases, and hence the heat generated by the reactor 1A is transferred to the case 12 via the heat transfer cushioning members 30 and 31 and radiated. Therefore, even when the amount of the heat to be generated by the reactor 1A is large, it is possible to efficiently cool the reactor 1A.

Additionally, in the present embodiment, an outer periphery of the pressing force imparting portion 87 (a portion in which the external thread portion 93a of the coupling screw 93 is screwed into the internal thread portion 91a of the metal tube 91 of the positioning coupling pillar 90) is surrounded with the cylindrical insulating portion 86b made of an insulator, and hence an insulating distance between the coupling screw 93 and the metal tube 91 and a coil 3 of the reactor 1A can sufficiently be acquired.

In addition, only by disposing the reactor 1A in a state where the positioning coupling pillar 90 of the placing member 85 is inserted into the hollow portion 1a, positioning of the reactor 1A to the placing member 85 is completed, and hence an attaching operation of the reactor 1A can easily be performed.

Sixth Embodiment

Figure 11:
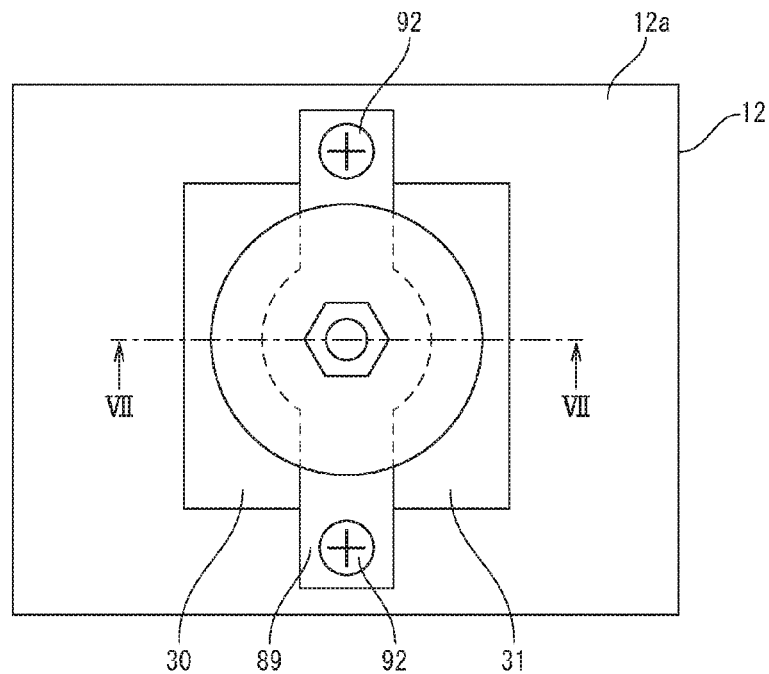
FIG. 11 is a plan view illustrative of a winding component attachment structure of a sixth embodiment according to the present invention.
Figure 12:
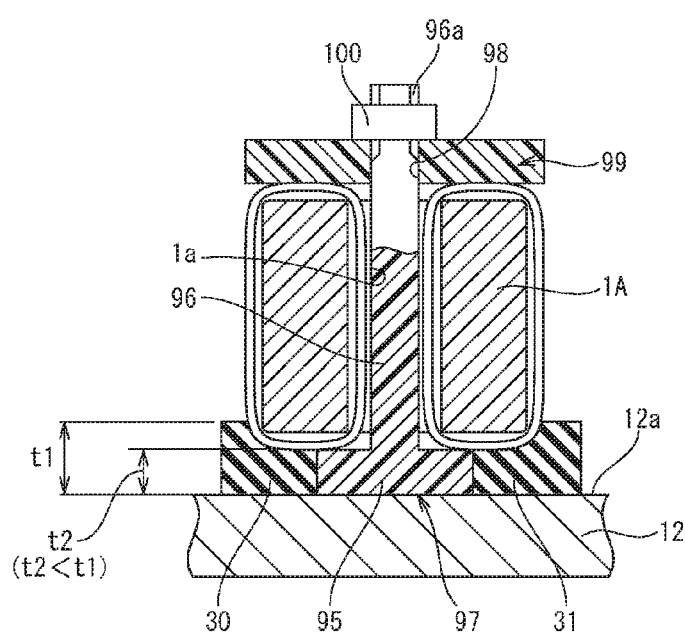
FIG. 12 is a view from an arrow direction of the XII-XII line of FIG. 11.

Furthermore, FIG. 11 and FIG. 12 illustrate a winding component attachment structure of a sixth embodiment according to the present invention, FIG. 11 is a plan view, and FIG. 12 is a view from an arrow direction of the XII-XII line of FIG. 11.

According to the present embodiment, there is provided an attachment structure in which one reactor 1A is fixed to a component fixing surface 12a of a case 12 of an AC/DC converter in the same manner as in the fifth embodiment illustrated in FIG. 9 and FIG. 10.

In the present embodiment, the attachment structure includes a placing member 97 on which one positioning coupling pillar 96 rises from a receiving portion 95, a pressing member 99 in which an inserting hole 98 is formed so that the positioning coupling pillar 96 passes therethrough, a nut 100 screwed into an external thread portion 96a of the positioning coupling pillar 96 that passes through the inserting hole 98 to be extended to an upper portion of the pressing member 99, and heat transfer cushioning members 30 and 31 sandwiched between the component fixing surface 12a and a lower surface of the reactor 1A,.

It is to be noted that a pressing force imparting portion according to the present invention includes the external thread portion 96a of the positioning coupling pillar 96, and the nut 100.

According to the attachment structure of the reactor of the present embodiment, the one reactor 1A for use as a power conversion control unit of a power conversion device mounted in a hybrid car or an electric car can securely be fixed to the case 12 by improving vibration resistant characteristics in the same manner as in the fifth embodiment.

Additionally, the heat transfer cushioning members 30 and 31 are sandwiched in a compressed state between the lower surface of the reactor 1A which is not placed on the receiving portion 95 of the placing member 97 and the component fixing surface 12a, so that a vibration transmitted to the case 12 is easy to be absorbed by the heat transfer cushioning members 30 and 31, and the vibration resistant characteristics can further improve.

In addition, also when an amount of heat to be generated by the reactor 1A is large, the heat transfer cushioning members 30 and 31 are brought into contact closely with the reactor 1A and the case 12 so that a heat transfer area between the reactor and the case increases, and hence the heat generated by the reactor 1A is transferred to the case 12 via the heat transfer cushioning members 30 and 31 and then radiated. Therefore, it is possible to efficiently cool the reactor 1A.

Furthermore, the positioning coupling pillar 96 of the placing member 97 functions as a positioning member of a hollow portion 1a of the reactor 1A and as a fixing member of the pressing member 99, and hence simplification of the reactor attachment structure can be achieved.

INDUSTRIAL APPLICABILITY

As described above, a winding component attachment structure according to the present invention and a power conversion device provided with this attachment structure are useful in securely fixing, to a case, a winding component such as a reactor having a different outer shape dimension for each product, by improving vibration resistant characteristics even when the winding component is mounted in a hybrid car, an electric car or the like.

REFERENCE SIGNS LIST 1A, 1B, and 1C . . . reactor, 1a, 1b and 1c . . . hollow portion, 2 . . . core, 3 . . . coil, 12 . . . case, 12a . . . component fixing surface, 12b . . . screw hole, 13 . . . placing member, 14 . . . pressing member, 15 . . . pressing force imparting portion, 16 . . . receiving portion, 17 . . . fixing portion, 17a . . . through hole, 18 and 19 . . . positioning portion, 20 . . . wall portion, 21 . . . coupling pillar, 22 . . . metal tube, 22a . . . internal thread portion, 23 . . . pressing portion, 24 and 25 . . . positioning portion, 26 . . . engaging concave portion, 27 . . . top plate, 27a . . . through hole, 28a . . . external thread portion, 30 and 31 . . . heat transfer cushioning member, 40 . . . placing member, 41 . . . pressing member, 42 . . . pressing force imparting portion, 43 . . . receiving portion, 44 to 46 . . . positioning portion, 47 and 48 . . . wall portion, 49 and 50 . . . coupling pillar, 51 . . . pressing portion, 52 to 54 . . . positioning portion, 55 and 56 . . . engaging concave portion, 57 and 58 . . . top plate, 60 . . . placing member, 61 . . . pressing member, 62 . . . pressing force imparting portion, 63 . . . receiving portion, 64 . . . fixing portion, 65 and 66 . . . positioning coupling pillar, 65a and 66a . . . external thread portion, 67 and 68 . . . inserting hole, 69 and 70 . . . nut, 71 . . . receiving portion, 72 to 74 . . . positioning coupling pillar, 72a, 73a and 74a . . . external thread portion, 75 . . . placing member, 76 to 78 . . . inserting hole, 79 . . . pressing member, 80, 81 and 82 . . . nut, 85 . . . placing member, 86 . . . pressing member, 86a . . . screw through hole, 86b . . . cylindrical insulating portion, 87 . . . pressing force imparting portion, 88 . . . receiving portion, 89 . . . fixing portion, 90 . . .

positioning coupling pillar, 91 . . . metal tube, 91*a* . . . internal thread portion, 92 . . . fixing screw, 93 . . . coupling screw, 93*a* . . . external thread portion, 95 . . . receiving portion, 96 . . . positioning coupling pillar, 96*a* . . . external thread portion, 97 . . . placing member, 98 . . . inserting hole, 99 . . . pressing member, and 100 . . . nut.

The invention claimed is:

1. A winding component attachment structure in which a winding component is fixed to a case, the winding component being formed by winding a coil around and along an inner peripheral surface and an outer peripheral surface of a ring-shaped core a plurality of times, the attachment structure comprising:
    a placing member made of an insulating material and fixed to a fixing surface of the case in a state where a lower surface of the winding component is placed;
    a pressing member made of an insulating material and disposed to abut on an upper surface of the winding component; and
    a pressing force imparting portion that couples the placing member with the pressing member and imparts a pressing force toward the fixing surface, from the pressing member to the winding component,
    wherein in the pressing force imparting portion, a distance between the placing member and the pressing member is variable in accordance with a height change of the winding component, and
    a part of the lower surface of the winding component is placed on the placing member, and the winding component is pressed and fixed to a side of the fixing surface in a state where a cushioning material that absorbs a vibration transmitted to the case is sandwiched between the residual part of the lower surface of the winding component and the fixing surface.

2. The winding component attachment structure according to claim 1,
    wherein the pressing force imparting portion comprises an external thread portion disposed in one of the placing member and the pressing member to extend toward the other member, and an internal thread portion disposed in the other member of the placing member and the pressing member and screwed into the one external thread portion; and a distance between the placing member and the pressing member is variable by changing a screwing position of the external thread portion into the internal thread portion.

3. The winding component attachment structure according to claim 1,
    wherein the placing member comprises a lower positioning portion that projects upward to be inserted into a hollow portion of the winding component from a lower opening, and
    the pressing member comprises an upper positioning portion that projects downward to be inserted into the hollow portion of the winding component from an upper opening.

4. The winding component attachment structure according to claim 1,
    wherein at least two winding components are disposed in the form of a row on the placing member, and
    the pressing force imparting portion is disposed between the two adjacent winding components.

5. The winding component attachment structure according to claim 1,
    wherein the pressing force imparting portion has a function of positioning the winding component by passing through the hollow portion of the winding component.

6. The winding component attachment structure according to claim 1,
    wherein the cushioning material is a member excellent in thermal conductivity.

7. A power conversion device which is provided with the winding component attachment structure according to claim 1.

* * * * *